United States Patent
DeLuca et al.

(10) Patent No.: US 10,075,812 B1
(45) Date of Patent: *Sep. 11, 2018

(54) DYNAMIC GEO-FENCE SIZE ADJUSTMENT

(71) Applicant: International Business Machines Corporation, Armonk, NY (US)

(72) Inventors: Lisa Seacat DeLuca, Baltimore, MD (US); Jeremy A. Greenberger, Raleigh, NC (US); Nicholas R. Sandonato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,431

(22) Filed: Nov. 8, 2017

Related U.S. Application Data

(63) Continuation of application No. 15/626,476, filed on Jun. 19, 2017, now Pat. No. 9,894,478.

(51) Int. Cl.
*H04W 4/02* (2018.01)
*H04W 4/021* (2018.01)

(52) U.S. Cl.
CPC .................. *H04W 4/022* (2013.01)

(58) Field of Classification Search
CPC ........... G06F 17/30867; G06F 17/3087; G06F 17/3053; G06F 21/6245; G06F 17/30528; G06F 17/30554; G06F 17/30569; G06F 19/00; G06F 19/3406; G06F 19/3418; G06F 21/10; G06F 21/31; G06F 21/316; G06F 2221/2111; H04M 2203/10
See application file for complete search history.

(56) References Cited

U.S. PATENT DOCUMENTS

| | | | |
|---|---|---|---|
| 8,471,701 B2 | 6/2013 | Yariv et al. | |
| 9,060,248 B1 | 6/2015 | Coulombe et al. | |
| 2012/0200411 A1* | 8/2012 | Best ........................ | H04W 4/90 340/539.13 |
| 2014/0006129 A1 | 1/2014 | Heath | |

(Continued)

OTHER PUBLICATIONS

IBM, Appendix P, "List of IBM Patents or Patent Applications Treated as Related", 2 pages, dated Nov. 8, 2017.

(Continued)

*Primary Examiner* — Quan M Hua
(74) *Attorney, Agent, or Firm* — William H. Hartwell

(57) ABSTRACT

In one embodiment, a method for dynamically adjusting a location based geo-fence based on current or predicted weather is provided. The method includes determining a target number of users to be reached for an area using a geo-fence and receiving an indication of a predicted meteorological event for the area covered by the geo-fence. The method further includes generating a predicted number of users that will trigger the geo-fence based on: a desired location, a current size, and a predicted effect the predicted meteorological event will have on the number users that trigger the geo-fence. The method further includes, responsive to the predicted number of users being below a threshold, increasing the size of the geo-fence such that the predicted number of users at least meets the threshold and sending a notification to a given user of the number of users in response to the given user triggering the geo-fence.

20 Claims, 7 Drawing Sheets

(56) References Cited

U.S. PATENT DOCUMENTS

| | | | |
|---|---|---|---|
| 2014/0155094 A1* | 6/2014 | Zises | H04W 4/021 |
| | | | 455/456.3 |
| 2015/0111524 A1* | 4/2015 | South | H04W 4/90 |
| | | | 455/404.2 |
| 2015/0120455 A1 | 4/2015 | McDevitt et al. | |
| 2015/0148061 A1 | 5/2015 | Koukoumidis et al. | |
| 2016/0048872 A1 | 2/2016 | Sanchez et al. | |
| 2016/0169696 A1 | 6/2016 | Butts, III et al. | |
| 2016/0330583 A1 | 11/2016 | Zises | |

OTHER PUBLICATIONS

Pongpaichet et al., "Situation Fencing: Making Geo-Fencing Personal and Dynamic", PDM'13, Oct. 22, 2013, Barcelona, Spain, pp. 3-10, Copyright © 2013 ACM, 978-1-4503-2397-0/13/10, <http://dx.doi.org/10.1145/25093522509401>.

"Creating and Monitoring Geofences", Android Developers, printed on Feb. 23, 2017, 8 pages, <https://developer.android.com/training/location/geofencing.html>.

"Mobile Device Resource Conservation During Geo-Location Operations", An IP.com Prior Art Database Technical Disclosure, Authors et. al.: Disclosed Anonymously, IP.com No. IPCOM000231493D, IP.com Electronic Publication Date: Oct. 2, 2013, 18 pages, <:http://ip.com/IPCOM/000231493>.

DeLuca et al., "Dynamic Geo-Fence Size Adjustment", U.S. Appl. No. 15/626,476, filed Jun. 19, 2017, 50 pages.

\* cited by examiner

DYNAMIC GEO-FENCE SIZE ADJUSTMENT

BACKGROUND

The present invention relates generally to the field of geo-fencing, and more particularly to dynamically adjusting a location based geo-fence based on current or predicted weather.

A geo-fence is a virtual perimeter for a real-world geographic area. A geo-fence can be dynamically generated, as in a radius around a store or point location, or a geo-fence can be a predefined set of boundaries, like school attendance zones or neighborhood boundaries.

The use of a geo-fence is called geo-fencing, and one example of usage involves a location-aware device, such as a mobile device, of a location-based service (LBS) user entering or exiting a geo-fence. The activity of entering or exiting a geo-fence can trigger an alert, or a message, to be transmitted the device as well as messaging to the geo-fence operator. The transmitted information, which can contain the location of the mobile device, can be sent to a mobile telephone, or an email account.

SUMMARY

Embodiments of the present invention disclose a method, computer program product, and system for dynamically adjusting a location based geo-fence based on current or predicted weather. The method includes determining a target number of users to be reached for an area using a geo-fence. The method further includes receiving an indication of a predicted meteorological event for the area covered by the geo-fence. The method further includes generating a predicted number of users that will trigger the geo-fence based on: a desired location of the geo-fence, a current size of the geo-fence, and a predicted effect the predicted meteorological event will have on the number users that trigger the geo-fence. The method further includes, responsive to the predicted number of users being below a threshold, increasing the area covered by the geo-fence such that the predicted number of users at least meets the threshold, and sending a notification to a given user of the number of users in response to the given user triggering the geo-fence.

DETAILED DESCRIPTION

Embodiments in accordance with the present invention recognize a system and method to dynamically adjust features of a location-based geo-fence based on current or predicted weather. A geo-fence is conventionally a circular or polygon defined area around a point on a map that is often defined by the areas latitude and longitude. Developers currently define geo-fences to enhance mobile applications, such as knowing when to push a message to a customer when the customer is near a venue, or to track an individual, such as turning on the lights in a house when the individual is almost home. Embodiments of the present invention improve upon existing geo-fence-based mobile applications, allowing venue operators to adjust the size and location of geo-fences based on the approaching weather. For example, a snow storm can be predicted for a later time in the week. As the predicted date approaches, a larger geo-fence can be applied to a supermarket to broaden the range of the target audience for bread and milk.

Figure 1:
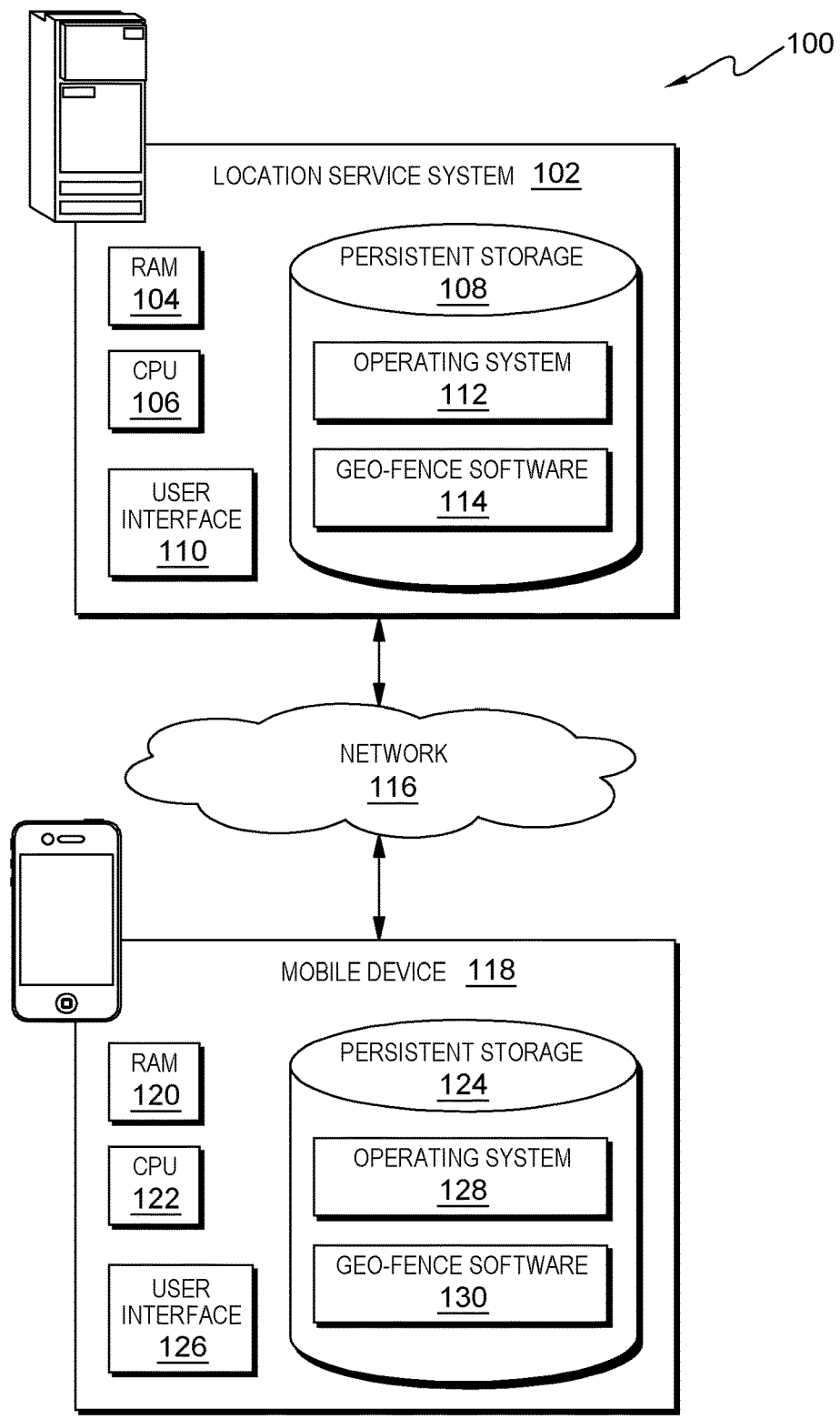
FIG. 1 is a functional block diagram illustrating a virtual geographic environment, in an embodiment in accordance with the present invention.

Embodiments in accordance with the present invention will now be described in detail with reference to the Figures. FIG. 1 is a functional block diagram, generally designated 100, illustrating a virtual geographic environment, in an embodiment in accordance with the present invention.

Virtual geographic environment 100 includes location service system 102, mobile device 118, and other computing devices (not shown), all interconnected over network 116. Location service system 102 includes random access memory (RAM) 104, central processing unit (CPU) 106, persistent storage 108, and user interface 110. Location service system 102 may be a Web server, or any other electronic device or computing system, capable of processing program instructions and receiving and sending data. In some embodiments, location service system 102 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, location service system 102 may represent server computing systems utilizing multiple computers as a server system, such as in a distributed computing environment. In general, location service system 102 is representative of any electronic device or combinations of electronic devices capable of executing machine-readable program instructions and communicating with mobile device 118 via network 116 and with various components and devices (not shown) within virtual geographic environment 100.

Location service system 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information.

Operating system F is stored in persistent storage 108, as well as software that enables location service system 102 to communicate with mobile device 118 and other computing devices (not shown) of virtual geographic environment 100 over a data connection on network 116. In other example embodiments, geo-fence software 114 may be components of an operating system 112.

Geo-fence software 114 is a computer program, or set of computer programs, that is stored in persistent storage 108. Geo-fence software 114 enables an administrator to define parameters for, and create, a geo-fence for a venue or event. For example, an administrator can define one or more parameters the define how many minutes and/or hours in advance to activate the geo-fence. The administrator can also define one or more parameters the define how many minutes and/or hours after the event to deactivate the geo-fence. In one example embodiment, an administrator can use the above parameters to configure geo-fence software 114 to monitor data relating to a weather event, wherein geo-fence software 114 can continuously monitor data relating to the weather event and dynamically create one or more geo-fences to transmit weather alerts to the public. Geo-fence software 114 can dynamically increase or decrease the size of the one or more geo-fences based on the monitored data, activate one or more new geo-fences to stay ahead of the weather event, and deactivate the one or more geo-fences once the weather event has passed. In another embodiment, geo-fence software 114 can detect when a mobile device enters or leaves a geo-fence. Upon detecting that a mobile device has entered, or has left, a geo-fence related to a weather event, geo-fence software 114 can transmit information relating to the weather-related event. For example, geo-fence software 114 can transmit a message informing the user of the mobile device of the approaching weather event and remind the user of the mobile device to purchase food supplies to have at home while waiting for the weather event to pass.

Location service system 102 includes user interface 110. User interface 110 is a program that provides an interface between a user of location service system 102 and a plurality of applications that reside on location service system 102 (e.g., geo-fence software 114), and/or applications on computing devices that may be accessed over a data connection on network 116. A user interface, such as user interface 110, refers to the information (e.g., graphic, text, sound) that a program presents to a user and the control sequences the user employs to control the program. User interface 110 is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. A variety of types of user interfaces exist. In one embodiment, user interface 110 is a graphical user interface (GUI). In another embodiment, user interface 110 may be a web user interface (WUI) and can display text, documents, web browser windows, user options, application interfaces, and instructions for operation, and includes the information (such as graphic, text, and sound) that a program presents to a user and the control sequences the user employs to control the program. User interface 110 may also be mobile application software that provides an interface between a user of location service system 102 and other computing devices over a data connection on network 116. Mobile application software, or an "app," is a computer program designed to run on smart phones, tablet computers and other computing devices (not shown) of virtual geographic environment 100. User interface 110 enables a user of location service system 102 to set preferences, also referred to as parameters, for manually and dynamically creating, activating, monitoring, and deactivating geo-fences.

Figure 7:
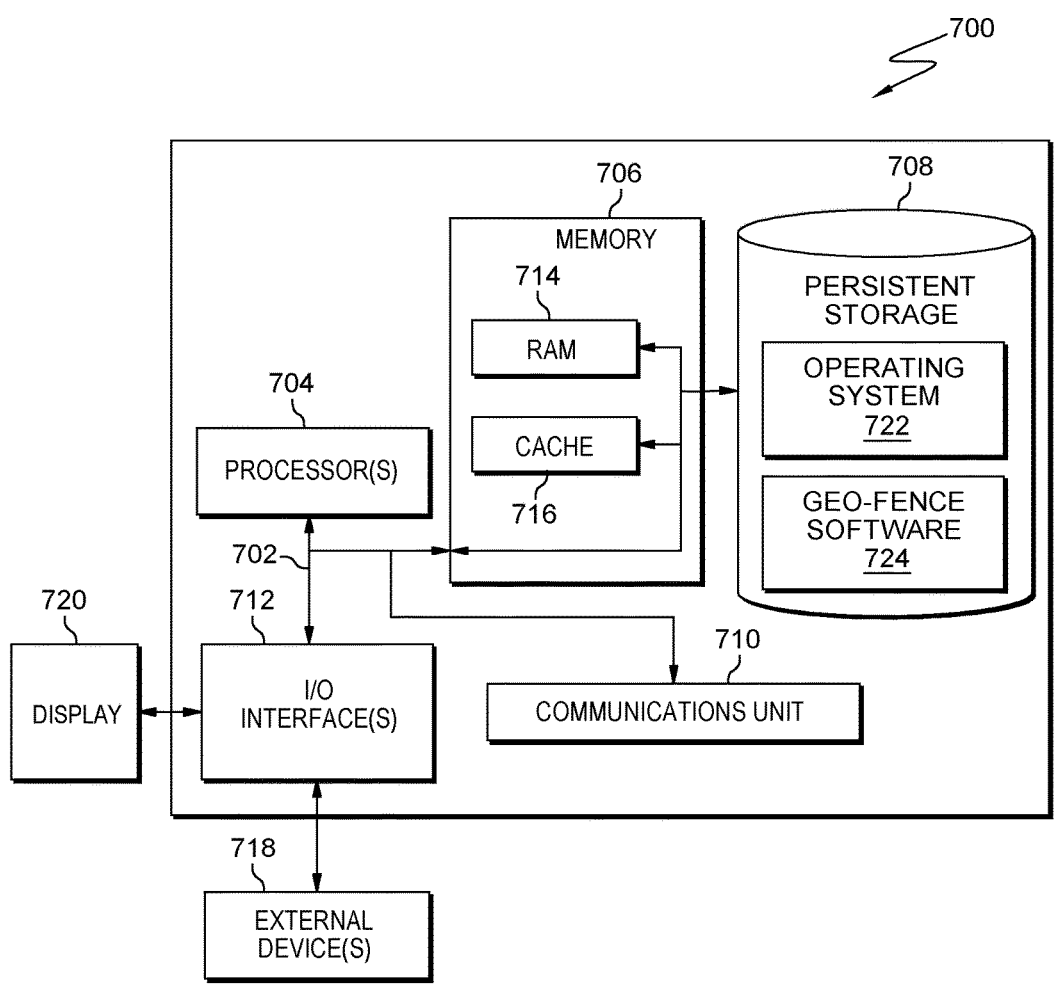
FIG. 7 depicts a block diagram of components of the location service system executing the intelligent mapping program, in an embodiment in accordance with the present invention.

Location service system 102 may include internal and external hardware components, as depicted and described in further detail with respect to FIG. 7.

In FIG. 1, network 116 is shown as the interconnecting fabric between location service system 102, mobile device 118, and with various components and devices (not shown) within virtual geographic environment 100. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between location service system 102, mobile device 118, and with various components and devices (not shown) within virtual geographic environment 100.

Mobile device 118 is included in virtual geographic environment 100. Mobile device 118 includes random access memory (RAM) 120, central processing unit (CPU) 122, and persistent storage 124. Mobile device 118 may be a Web server, or any other electronic device or computing system, capable of processing program instructions and receiving and sending data. In some embodiments, mobile device 118 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, mobile device 118 may represent server computing systems utilizing multiple computers as a server system, such as in a distributed computing environment. In general, mobile device 118 is representative of any electronic devices or combinations of electronic devices capable of executing machine-readable program instructions and communicating with location service system 102 via network 116 and with various components and devices (not shown) within virtual geographic environment 100.

Mobile device 118 includes persistent storage 124. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer-readable storage medium that is capable of storing program instructions or digital information.

Operating system 128 is stored in persistent storage 108, as well as software that enables mobile device 118 to communicate with location service system 102 and other computing devices (not shown) of virtual geographic environment 100 over a data connection on network 116. In other example embodiments, geo-fence software 130 may be components of an operating system 112.

Geo-fence software 130 is a computer program, or set of computer programs, that is stored in persistent storage 108. Geo-fence software 130 enables a user of mobile device 118 to download a list of geo-fences from location service system 102 and monitor the location of mobile device 118 to determine when mobile device 118 has breached, or entered, a geo-fence on the downloaded list of geo-fences. For example, prior to touring a city, a user of mobile device 118 downloads a list of geo-fences for one or more areas that will be toured. Geo-fence software 130 can then monitor the location of mobile device 118 to determine when the user has entered one of the defined geo-fences. Upon entering the geo-fence with mobile device 118, geo-fence software 130 can download one or more messages or alerts from a location service system 102, wherein the one or more messages or alerts can relate to sales, dining options, cafes, theaters, tourist attractions and/or museums in the area covered by the geo-fence.

In another embodiment, geo-fence software 130 can predict a next geo-fence the user of mobile device 118 will enter based on the current traveled route and refresh, or re-download, the list of geo-fences for that area. For example, using existing mobile tracking techniques, geo-fence software 130 can determine a current traveled route that the user of mobile device 118 has taken. Using the current traveled route, geo-fence software 130 can predict a next traveled area within the city and download a list of defined geo-fences for that area. In other embodiments, geo-fence software 130 can determine a next location by monitoring a calendar stored in persistent storage 124, or a calendar cloud service of virtual geographic environment 100.

Mobile device 118 includes user interface 126. User interface 126 is a program that provides an interface between a user of mobile device 118 and a plurality of applications that reside on mobile device 118 (e.g., geo-fence software 130), and/or applications on computing devices that may be accessed over a data connection on network 116. A user interface, such as user interface 126, refers to the information (e.g., graphic, text, sound) that a program presents to a user and the control sequences the user employs to control the program. User interface 126 is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. A variety of types of user interfaces exist. In one embodiment, user interface 126 is a graphical user interface (GUI). In another embodiment, user interface 126 may be a web user interface (WUI) and can display text, documents, web browser windows, user options, application interfaces, and instructions for operation, and includes the information (such as graphic, text, and sound) that a program presents to a user and the control sequences the user employs to control the program. User interface 126 may also be mobile application software that provides an interface between a user of mobile device 118 and other computing devices over a data connection on network 116. Mobile application software, or an "app," is a computer program designed to run on smart phones, tablet computers and other computing devices (not shown) of virtual geographic environment 100. User interface 126 enables a user of mobile device 118 to set preferences, also referred to as parameters, for manually and dynamically downloading lists of defined geo-fences from location service system 102. For example, a user of mobile device 118 can use user interface 126 to configure geo-fence software to not retrieve messages for certain restaurants in the area defined by one or more current geo-fences.

Figure 2:
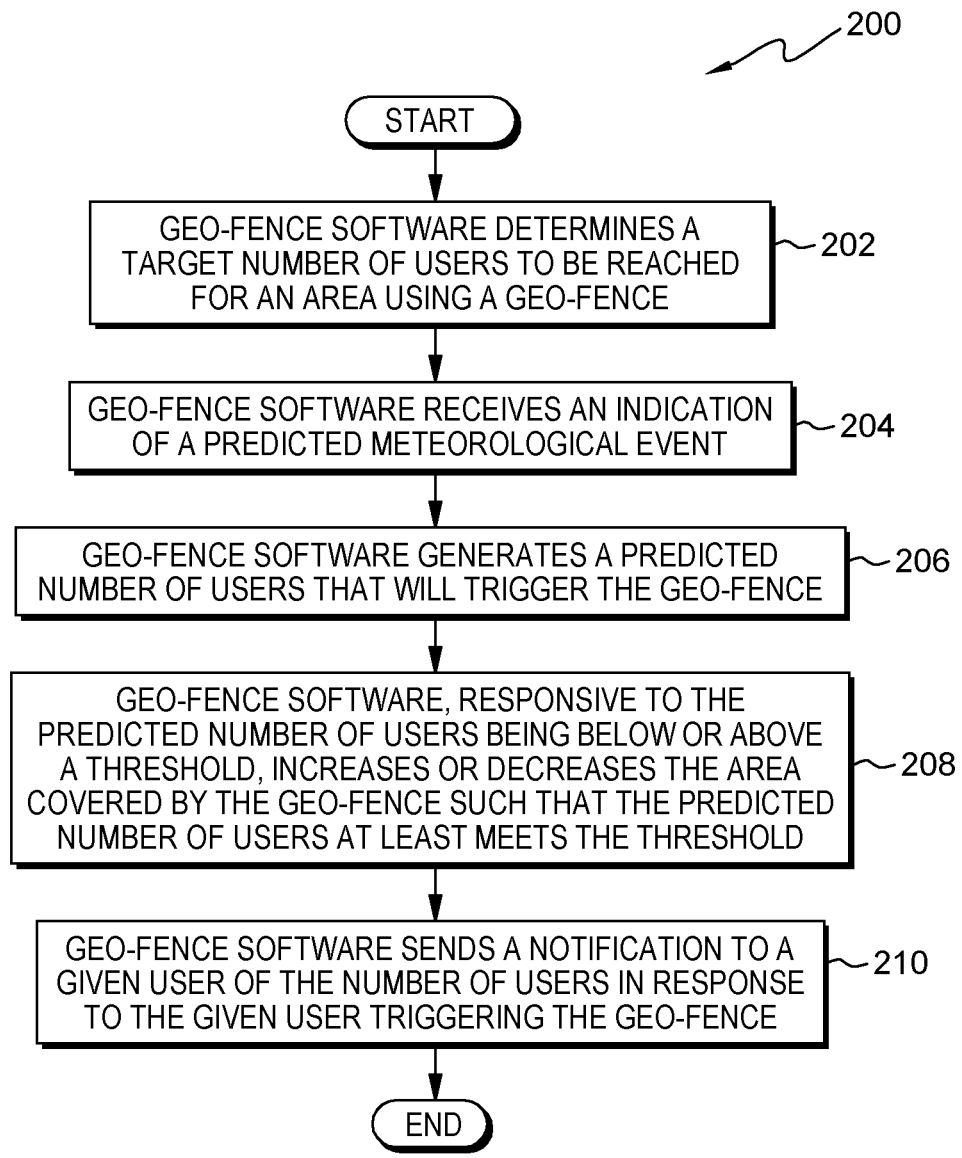
FIG. 2 is a flowchart depicting operational steps of a geo-fence software, on a location service system within the virtual geographic environment of FIG. 1, for predicting a target number of users in an area and creating and automatically adjusting a geo-fence based on a threshold for the target number of users, in an embodiment in accordance with the present invention.
Figure 3:
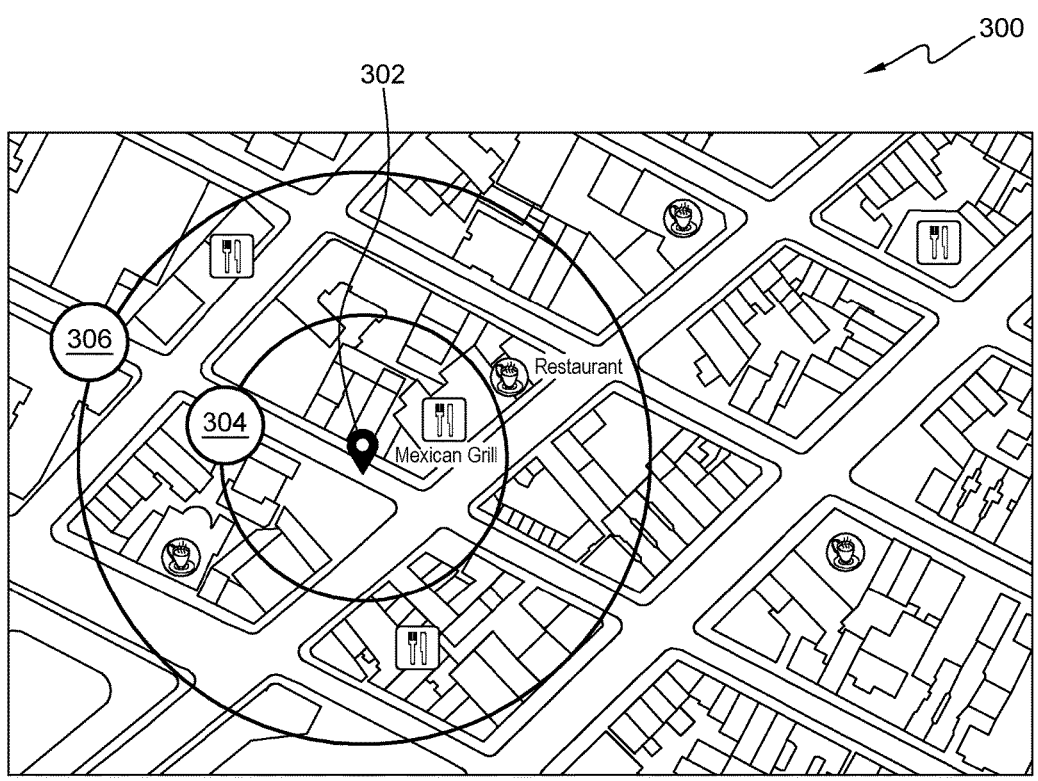
FIG. 3 is a diagram illustrating an expanded geo-fence for a given area in response to received event data, on a location service system within the virtual geographic environment of FIG. 1, in an embodiment in accordance with the present invention.

FIG. 2 is a flowchart, generally designated 200, illustrating operational steps of a geo-fence software, on a location service system within the virtual geographic environment of FIG. 1, for predicting a target number of users in an area and creating and automatically adjusting a geo-fence based on a threshold for the target number of users, in an embodiment in accordance with the present invention. In an example embodiment, an administrator configures location service system 102 to create a geo-fence at a certain location (e.g., location 302), to reach a determined target number of users within area 304 as depicted in the diagram of FIG. 3, generally designated 300. For example, an administrator for a retail store can configure geo-fence software 114 on location service system 102, using user interface 110, to create a geo-fence at location 302 to advertise a current sale. The administrator can configure one or more settings for geo-fence software 114 to create the geo-fence at location 302 on a certain date and time, a desired location, a duration for the geo-fence at location 302 to remain active, a target number of users the geo-fence at location 302 is expected to reach, also referred to as a target user threshold, and other data used to determine if one or more adjustments to the geo-fence at location 302 are required.

Geo-fence software 114 determines a target number of users to be reached for an area using a geo-fence at location 302 as depicted in step 202. For example, geo-fence software 114 analyzes one or more stored configuration settings to determine how many target users are expected to be reached with the geo-fence at location 302. Geo-fence software 114 can then later determine if the geo-fence at location 302 is reaching the expected target users (i.e., target user threshold), based on the current users that have entered the geo-fence at location 302 by breaching perimeter 304. In one example embodiment, geo-fence software 114 can periodically receive updated target user settings from the administrator, and/or from received data from other computing devices within virtual geographic environment 100. For example, geo-fence software 114 can receive updated target threshold values from one or more computing devices (e.g., analytics computing devices that analyze massive data sets that constantly change). Analytics computing is the discovery, interpretation, and communication of meaningful patterns in big data. In the industry of commercial analytics software, an emphasis has emerged on solving the challenges of analyzing massive, complex data sets, often when such data is in a constant state of change. Such data sets are commonly referred to as big data.

In step 204, geo-fence software 114 receives an indication of a predicted meteorological event. For example, geo-fence software 114 can be configured to monitor one or more weather Cloud services to determine if a meteorological event will impact the area that the geo-fence at location 302 currently covers (e.g., area 304). In one example embodiment, geo-fence software 114 receives data from a weather cloud service that indicates a meteorological event will impact area 304 that the current geo-fence at location 302 is covering.

Geo-fence software generates a predicted number of users that will trigger the geo-fence at location 302 as depicted in step 206. For example, using the configured target threshold for the number of users, a predicted effect for a number of impacted users determined from the received data relating to the meteorological event (e.g. the received data relating to the meteorological event indicates heavy rain showers will impact area 304 of the geo-fence at location 302), a desired location of the geo-fence, and a current size of the geo-fence at location 302, geo-fence software 114 can determine if the configured user threshold needs to be adjusted. For example, in addition to determining the approaching meteorological event, geo-fence software 114 can also determine that there will be an upcoming sporting event in a stadium that is within the area of the geo-fence at location 302. Based on the number of occupants the stadium can hold, geo-fence software 114 can increase the target threshold size to inform users of a sale on parkas so that users that spectators viewing the sporting event at the stadium will not be unprepared for the approaching meteorological event. A predicted meteorological event can affect the number of users in a given area since most people would not want to sit in the rain to watch a sporting event. However, upon receiving a notification of the predicted meteorological event and an offer or an availability of items relating to the predicted meteorological event, one or more users can decide to attend the sporting event by purchasing parkas. In one example embodiment, a predicted effect on the number of users that will attend the sporting event can be determined by analyzing historical spectator attendance (e.g., historical data), during one or more similar, or previous, meteorological events. In another example embodiment, geo-fence software 114 can determine the number of current users of the geo-fence at location 302 is below the configured threshold and dynamically increase the size of the geo-fence at location 302, (i.e., the area that the geo-fence at location 302 covers), to increase the number of users that breach, or enter, the geo-fence at location 302. In other example embodiments, geo-fence software 114 can be configured to increase the area covered by the geo-fence to, at most, a maximum area based on a maximum distance a given user is predicted to travel in a time period in which the geo-fence at location 302 is active. For example, geo-fence software 114 can monitor the movement of mobile device 118 and predict a distance that mobile device 118 will travel and increase the size of the geo-fence at location 302 to ensure mobile device 118 will remain within the covered area.

In step 208, geo-fence software 114, responsive to the predicted number of users being below or above a threshold, increases or decreases the area covered by the geo-fence at location 302 such that the predicted number of users at least meets the threshold. For example, based on the adjusted user threshold of step 206, geo-fence software 114 can dynamically increase the size of the geo-fence at location 302 to reach more users and notify them of the approaching meteorological event and the sale on parkas. For example, geo-fence software 114 increases the area of the geo-fence at location 302 from area 304, to area 306 as depicted in FIG. 3. Upon increasing the area of the geo-fence to area 306, geo-fence software can then notify all new users of the approaching meteorological event and the sale on parkas. In another example embodiment, upon determining that the current user threshold is too high (e.g., the meteorological event has passed therefore the need for parkas and rain gear is unnecessary), geo-fence software 114 can dynamically decrease the size of the geo-fence at location 302 to bring the current user threshold closer to the adjusted, or originally configured, user threshold. For example, geo-fence software 114 can decrease the area the geo-fence at location 302 covers from perimeter area, to area 304, as depicted in FIG. 3.

Geo-fence software 114 sends a notification to a given user of the number of users in response to the given user triggering the geo-fence at location 302 as depicted in step 210. For example, upon detecting that mobile device 118 has breached, or entered, the geo-fence at location 302 by crossing, or breeching, the perimeter of area 306, geo-fence software 114 can transmit one or more messages to the user of mobile device 118, wherein the messages can include information relating to the approaching meteorological event, and discounts on rain gear, such as parkas, and food supplies at the retail store. In another example embodiment, upon expanding the geo-fence at location 302 from area 304 to area 306, geo-fence software 114 can generate a notification to all existing users that are currently within area 304, and new users that have now entered the geo-fence at location 302 in the area between 304 and 306, wherein the notification can include information relating to current sales at the retail store, the approaching meteorological event, and discounts on rain gear, such as parkas, and food supplies as depicted in FIG. 3. Some other examples of information relating to predicted effect(s) of the approaching meteorological event can include, but are not limited to, the following: (i) a speed and direction of the approaching meteorological event, (ii) a severity of the approaching meteorological event, (iii) one or more areas expected to be impacted by the approaching meteorological event, (iv) one or more recommended safety precautions to avoid injury by the approaching meteorological event, and (v) one or more public shelters within the area covered by the geo-fence at location 302.

Additionally, geo-fence software can periodically transmit notifications to one or more mobile device 118's using the geo-fence at location 302, wherein the transmitted notifications can relate to updated sales, new sales, and/or information relating to detected or upcoming events that will take place within the geo-fence at location 302. In other example embodiments, responsive to determining that the geo-fence at location 302 has been increased to the maximum area and that the predicted number of users remains below the target user threshold, geo-fence software 114 can modify the notification such that a threshold number of users of the predicted number of users is predicted to respond to an offer included in the notification. For example, geo-fence software 114 can predict a number of users that will respond to an offer included in the notification based on the received data relating to the weather-related event and a current number of users of mobile device 118's that have already responded to the offer included in the notification.

Figure 4:
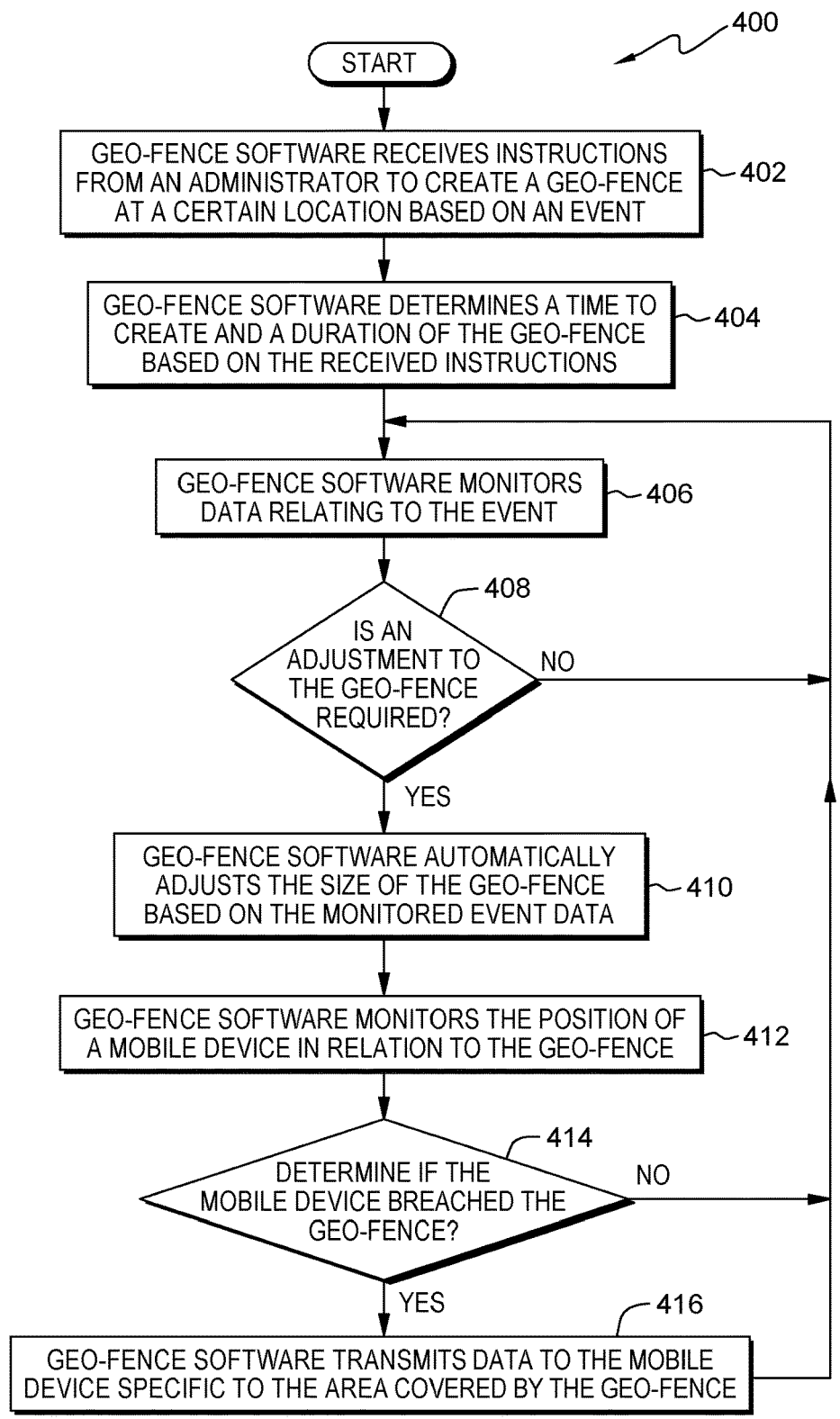
FIG. 4 is a flowchart depicting operational steps of a geo-fence software, on a location service system within the virtual geographic environment of FIG. 1, for manually creating and automatically adjusting a geo-fence based on data relating to an event, in an embodiment in accordance with the present invention.

FIG. 4 is a flowchart, generally designated 400, depicting operational steps of a geo-fence software 114, on a location service system 102 within the virtual geographic environment of FIG. 1, for manually creating and automatically adjusting a geo-fence based on data relating to an event, in an embodiment in accordance with the present invention.

Geo-fence software 114 receives instructions from an administrator to create a geo-fence, such as the geo-fence at location 302, at a certain location based on an event as depicted in step 402. For example, an administrator configures location service system 102, using user interface 110, to create the geo-fence at location 302 around an outdoor art expo in a local park. Geo-fence software 114 can receive one or more configuration settings relating to, but not limited to, one of the following: (i) a location to create the geo-fence, (ii) an area, or size, that the geo-fence is required to cover, (iii) a date and time to create the geo-fence, (iv) a duration for the geo-fence to remain active, (v) a user threshold that the geo-fence is expected to reach, (vi) and other data used to determine if one or more adjustments to the geo-fence are required.

In step 404, geo-fence software 114 determines a time to create and a duration of the geo-fence at location 302 based on the received instructions. For example, geo-fence software 114 determines the time to create the geo-fence at location 302 at the local park is at 9:00 AM based on the configured date and time entered by the administrator. In other example embodiments, geo-fence software 114 can dynamically create a geo-fence in response to receiving an indication that one or more emergency vehicles are responding to a dispatch call. Geo-fence software 114 can create one or more additional geo-fences along the emergency vehicle route to warn users of the emergency and to clear the road to let the emergency vehicles pass. Geo-fence software can track one or more emergency vehicles using cellular triangulation or global positioning system (GPS) technology and create a plurality of geo-fences along the route for the emergency vehicles prior to the emergency vehicles departing a station. Cellular triangulation, also referred to as mobile device tracking, is the ascertaining of the position, or location, of a mobile device, whether stationary or moving. The localization of the mobile device may occur either via multilateration of radio signals between one or more cell towers of the network and the mobile device, or simply via GPS. Multilateration is a surveillance technique based on the measurement of the difference in distance to two stations (i.e., cell towers), at known locations by broadcast signals at known times.

Geo-fence software 114 monitors data relating to the event as depicted in step 406. For example, geo-fence software 114 can monitor the number of people attending the outdoor art expo by monitoring the number of mobile devices that enter, breach, or exit the geo-fence at location 302. In addition to monitoring the number of devices that enter or exit the geo-fence at location 302, geo-fence software 114 can also monitor the number of tickets sold for the event, or monitor data from one or more vendors relating to current sales or upcoming performances at specific booths.

In decision step 408, geo-fence software 114 determines if an adjustment to the geo-fence at location 302 is required. For example, upon determining the number of people attending the outdoor art expo is below the configured threshold set by the administrator, geo-fence software calculates a new perimeter for the geo-fence at location 302. For example, geo-fence software 114 can determine the number of people living in the surrounding area, specifically the number of people with registered addresses on the streets surrounding area 304 by accessing one or more public databases. Geo-fence software 114 can then determine that increasing the size of the geo-fence at location 302 from area 304 to area 306 could meet the target threshold initially set by the administrator. If geo-fence software 114 determines that an adjustment to the geo-fence at location 302 is not required ("No" branch, decision 408), geo-fence software 114 repeats step 406 as depicted in FIG. 4. If geo-fence software 114 determines that an adjustment to the geo-fence at location 302 is required ("Yes" branch, decision 408), geo-fence software 114 automatically adjusts the size of the geo-fence at location 302 based on the monitored event data from area 304 to area 306.

Geo-fence software 114 automatically adjusts the size of the geo-fence at location 302 based on the monitored event data as depicted in step 410. For example, upon determining that the number of people with registered addresses on the streets surrounding area 304 can meet the target threshold initially set by the administrator, geo-fence software 114 can increase the geo-fence at location 302 from area 304 to area 306 as depicted in FIG. 3. In other example embodiments, geo-fence software can establish secondary geo-fences to cover interstate thruways to advertise the outdoor art expo to travelers to inform them about the event taking place and/or to warn traveling motorists of any detected weather-related events.

In step 412, geo-fence software 114 monitors the position of a mobile device in relation to the geo-fence at location 302. For example, geo-fence software 114 can monitor the position of mobile device 118 in relation to the geo-fence at location 302 using cellular triangulation or GPS tracking technology known in the art. This can allow geo-fence software 114 to determine when mobile device 118 has breached, or entered, area 306. In other example embodiments, geo-fence software 130 on mobile device 118 can download a list of one or more defined geo-fences from location service system 102. Upon determining that mobile device 118 has entered a geo-fence on the list of one or more defined geo-fences, geo-fence software 130 can retrieve one or more messages relating to events in the area covered by the geo-fence.

In decision step 414, geo-fence software 114 determines if the mobile device breached the geo-fence at location 302. For example, upon using cellular triangulation or GPS tracking techniques, geo-fence software 114 can estimate a position of mobile device 118 that is inside area 306. Geo-fence software 114 can then determine that the estimated position of mobile device 118 is within the area covered by area 306 of the geo-fence at location 302. If geo-fence software 114 determines that mobile device 118 did not breach the geo-fence at location 302 ("No" branch, decision step 414), geo-fence software 114 repeats step 406 as depicted in FIG. 4. If geo-fence software 114 determines that mobile device 118 breached the geo-fence at location 302 ("Yes" branch, decision step 414), geo-fence software 114 can transmit data specific to the area covered by the geo-fence at location 302.

Geo-fence software 114 transmits data to the mobile device specific to the area covered by the geo-fence at location 302 as depicted in step 416. For example, geo-fence software 114 can transmit information to mobile device 118 relating to the outdoor art expo in the local park, such as, the date and duration the event will last, directions to the event, information relating to the vendors, and the type of art work on display.

Figure 5:
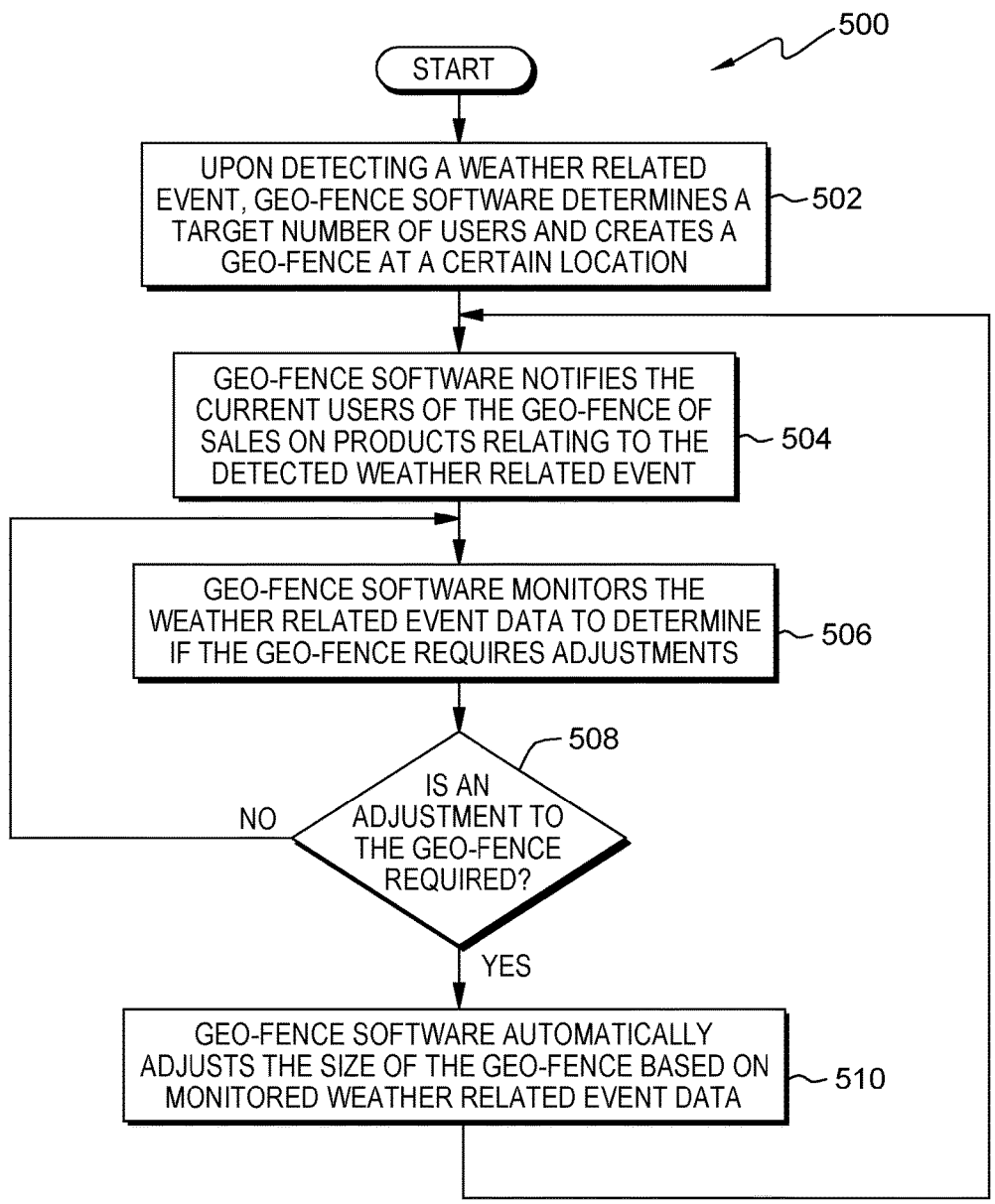
FIG. 5 is a flowchart depicting operational steps of a geo-fence software, on a location service system within the virtual geographic environment of FIG. 1, for detecting a weather-related event and automatically creating and adjusting a geo-fence based on monitored data of the weather-related event, in an embodiment in accordance with the present invention.

FIG. 5 is a flowchart, generally designated 500, depicting operational steps of a geo-fence software, on a location service system within the virtual geographic environment of FIG. 1, for detecting a weather-related event and automatically creating and adjusting a geo-fence based on monitored data of the weather-related event, in an embodiment in accordance with the present invention. In another example embodiment, geo-fence software 114 receives an indication of a weather-related event approaching the geo-fence at location 302.

Upon detecting a weather-related event, geo-fence software 114 determines a target number of users and creates a geo-fence at location 302 as depicted in step 502. For example, geo-fence software 114 can determine a number of people, and/or area, that will be impacted by the approaching weather-related event and create a geo-fence at location 302 based on the forecasted data (i.e., the received weather-related event data) from a weather surveillance radar (WSR) system. WSR, also referred to as Doppler weather radar, is a type of radar used to locate precipitation, calculate its motion, and estimate the type of precipitation, such as rain, snow, and/or hail.

In step 504, geo-fence software 114 notifies the current users of the geo-fence at location 302 about sales on products relating to the detected weather-related event. For example, geo-fence software 114 can search for current sales and/or inventory for one or more retailers in the area to determine the lowest prices for food supplies and clothing for the approaching weather-related event. Geo-fence software 114 can then notify one or more users of the geo-fence at location 302 about the approaching weather-related event and the determined sales and lowest prices of the one or more retailers in the area for food supplies and clothing that may be required. In other example embodiments, geo-fence software 114 can notify retailers in the area of the approaching weather-related event and receive a list of food supplies and clothing that are on sale and/or applicable to the approaching weather-related event.

Geo-fence software 114 monitors the weather-related event data to determine if the geo-fence at location 302 requires adjustments as depicted in step 506. For example, geo-fence software 114 can continuously track the projected and actual path of the weather-related event data to determine whether to dynamically adjust the size and location of the geo-fence at location 302 to ensure the geo-fence at location 302 is always ahead of the weather-related event. In other example embodiments, where the weather-related event is too large to be covered by the geo-fence at location 302, geo-fence software 114 can create a plurality of geo-fences and then dynamically adjust and move the plurality of geo-fences to ensure that the plurality of geo-fences are always ahead of the projected path of the weather-related event.

In decision step 508, geo-fence software 114 determines if an adjustment is required to the geo-fence at location 302. For example, upon determining the weather-related event has moved closer to the geo-fence at location 302, using the weather-related event data, geo-fence software 114 can determine whether or not to adjust the size and/or location of the geo-fence at location 302. For example, upon tracking the projected path and speed of the weather-related event, geo-fence software 114 can determine to adjust the size and move the location of the geo-fence at location 302 one mile East. In one example embodiment, upon determining the weather-related event data indicates the weather-related event has diminished, geo-fence software 114 can determine to decrease the size or remove the geo-fence at location 302. In another example embodiment, upon determining the weather-related event data indicates the weather-related event has moved closer and/or increased in size, geo-fence software 114 can determine to adjust the size and/or location of the geo-fence at location 302. If geo-fence software 114 determines that an adjustment is not required to the geo-fence at location 302 ("No" branch, decision step 508), geo-fence software 114 continues to monitor the weather-related event data in step 506 as depicted in FIG. 5. If geo-fence software 114 determines that an adjustment is required to the geo-fence at location 302 ("Yes" branch, decision step 508), geo-fence software 114 can automatically adjust the size of the geo-fence at location 302 based on the monitored weather-related event data as depicted in step 510.

Geo-fence software 114 automatically adjusts the size of the geo-fence at location 302 based on the monitored weather-related event data as depicted in step 510. For example, upon tracking the projected path and speed of the weather-related event, geo-fence software 114 can adjust and/or move the location of the geo-fence at location 302 one mile North-East. In one example embodiment, upon determining the weather-related event data indicates the weather-related event has diminished, geo-fence software 114 can decrease the size or remove the geo-fence at location 302. In another example embodiment, upon determining the weather-related event data indicates the weather-related event has moved closer and/or increased in size, geo-fence software 114 can adjust the size and/or location of the geo-fence at location 302.

Figure 6:
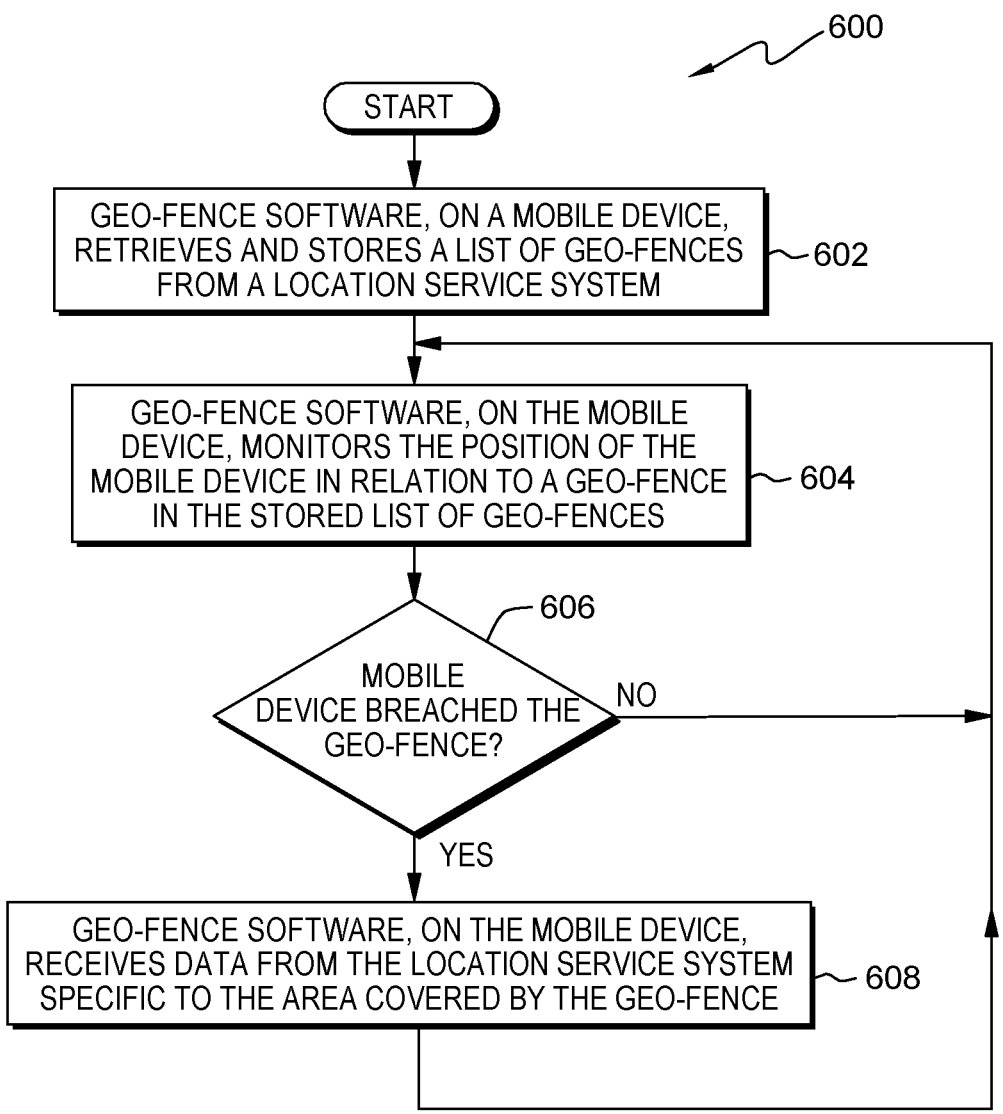
FIG. 6 is a flowchart depicting operational steps of a geo-fence software, on a mobile device within the virtual geographic environment of FIG. 1, for detecting a breach of a geo-fence by the mobile device and receiving data for an event covered by the geo-fence, in an embodiment in accordance with the present invention.

FIG. 6 is a flowchart, generally designated 600, depicting operational steps of a geo-fence software, on a mobile device within the virtual geographic environment of FIG. 1, for detecting a breach of a geo-fence by the mobile device and receiving data for an event covered by the geo-fence, in an embodiment in accordance with the present invention. In another example embodiment, mobile device 118 contains a geo-fence software 130 in persistent storage 124 that can retrieve a list of geo-fences for an area. Upon entering a geo-fence of the list of geo-fences, geo-fence software 130 can retrieve one or more messages related to the area and events within the geo-fence.

Geo-fence software 130 retrieves and stores a list of geo-fences from a location service system 102 as depicted in step 602. For example, a user of mobile device 118, using user interface 126, enables mobile device 118 to automatically download lists of defined geo-fences from location service system 102. Geo-fence software 130 can then monitor the position of mobile device 118 in relation to one of the defined geo-fences in the stored list of geo-fences from location service system 102. In other example embodiments, a user of mobile device 118 can configure geo-fence software 130 to exclude certain defined geo-fences from location service system 102. For example, a user may not want to receive notifications from a certain event that has a defined geo-fence associated with it.

In step 604, geo-fence software 130, on mobile device 118, monitors the position of mobile device 118 in relation to a geo-fence in the stored list of geo-fences. For example, upon downloading a defined geo-fence at location 302 from location service system 102, geo-fence software 130 monitors the position of mobile device 118 in relation to the geo-fence at location 302 using GPS technology known in the arts. In other example embodiments, geo-fence software 130 can monitor a group of mobile devices in relation to one or more geo-fences in the stored list of geo-fences. For example, a user of mobile device 118, with a family share plan comprised of two or more mobile devices, can configure geo-fence software 130 to monitor the position of the two or more mobile devices in relation to the one or more geo-fences in the stored list of geo-fences.

In decision step 606, geo-fence software 130 determines if mobile device 118 has breached the geo-fence at location 302. For example, geo-fence software 130 determines if the user of mobile device 118 has crossed the perimeter of the geo-fence at location 302 and is currently located within the area covered by area 306. If geo-fence software 130 determines that the user of mobile device 118 has not crossed the perimeter of the geo-fence at location 302 ("No" branch, decision step 606), geo-fence software 130 continues to monitor the position of mobile device 118 in relation to a geo-fence in the stored list of geo-fences as depicted in FIG. 6. If geo-fence software 130 determines that the user of mobile device 118 has crossed the perimeter of the geo-fence at location 302 ("Yes" branch, decision step 606), geo-fence software 130 can receive one or more notifications (i.e., data), from location service system 102.

Geo-fence software 130, on the mobile device 118, receives data from location service system 102 specific to the area covered by the geo-fence at location 302 as depicted in step 608. For example, geo-fence software 130 can retrieve one or more notifications relating to the area covered by the geo-fence at location 302. For example, the one or more notifications can include, but not limited to, one of the following: (i) traffic conditions within the area covered by the geo-fence at location 302, (ii) one or more sales for retailers within the area covered by the geo-fence at location 302, (iii) detected weather events that can impact the area covered by the geo-fence at location 302, and (iv) emergency notifications within the area covered by the geo-fence at location 302.

In an alternate example embodiment, location service system can push one or more updates to mobile device 118 of where to monitor for geo-fences based on the updated location of mobile device 118. For example, upon determining mobile device 118 has changed location from a previously determined location, location service system 102 can push, or transmit, a new or updated list of defined geo-fences for the current area that mobile device 118 is currently in. In other example embodiments, geo-fence software 130 can continuously, or periodically, transmit a current location of mobile device 118 to location service system 102. Upon determining that mobile device 118 is in a new area not covered by the previously transmitted list of geo-feces, geo-fence software 114 can push, or transmit, a new list of defined geo-fences for the area that mobile device 118 is currently in.

In another alternate example embodiment, a location service system 102 can be used to monitor traffic on interstate thruways and bridges, then dynamically adjust express lanes based on the current traffic patterns of monitored users that enter and exit one or more at one or more locations on the thruway. For example, location service system 102 can be configure to monitor the traffic for an interstate thruway bridge and adjust the express lanes to accommodate the traffic flow at certain times during the day. Location service system 102 can create a geo-fence at each end of the bridge to monitor the number of vehicles entering the bridge and one or more geo-fences to monitor the express lane(s) to determine the current traffic flow. Based on the current morning rush-hour traffic on one direction (e.g., direction A), where the traffic in the opposite direction (e.g., direction B) is low and the express lane(s) is not being utilized by commuters, location service system can automatically close the express lane(s) to direction B and then reopen the express lanes to the rush-hour commuters for direction A. Prior to closing the express lane(s) to direction B, location service system 102 can notify users of direction B that the express lanes are closing to make commuters aware.

FIG. 7 depicts a block diagram, generally designated 700, of components of the location service system executing the intelligent mapping program, in an embodiment in accordance with the present invention. It should be appreciated that FIG. 7 provides only an illustration of one implementation and does not imply any limitations with regard to the environments in which different embodiments may be implemented. Many modifications to the depicted environment may be made.

Location service system 102 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Operating system 722 and geo-fence software 724 are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of network 116 and mobile device 118. In these examples, communications unit 710 includes one or more network interface cards. Communications unit 710 may provide communications through the use of either or both physical and wireless communications links. Operating system 722 and geo-fence software 724 may be downloaded to persistent storage 708 through communications unit 710.

I/O interface(s) 712 allows for input and output of data with other devices that may be connected to location service system 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., operating system 722 and geo-fence software 724, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" acting as a single "user."

The terms "receive," "provide," "send," "input," and "output" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Automatically" means "without any human intervention."

These terms, while difficult to precisely define, are well understood by those skilled in the art.

What is claimed is:

1. A computer-implemented method for modifying an area covered by a geo-fence to increase a predicted number of users to receive notifications when triggering the geo-fence, the method comprising:
    determining, by one or more computer processors, a target number of users to be reached for an area using a geo-fence;
    receiving, by one or more computer processors, an indication of a predicted meteorological event for the area covered by the geo-fence;
    generating, by one or more computer processors, a predicted number of users that will trigger the geo-fence based on:
    a current size of the geo-fence, and
    a predicted effect the predicted meteorological event will have on the number of users that trigger the geo-fence; and
    responsive to the predicted number of users being below a threshold, increasing, by one or more computer processors, the area covered by the geo-fence such that the predicted number of users at least meets the threshold.

2. The computer-implemented method of claim 1, wherein the geo-fence is configured to increase the area covered by the geo-fence to at most a maximum area based on a maximum distance a given user is predicted to travel in a time period in which the geo-fence is active.

3. The computer-implemented method of claim 2, further comprising:
    sending, by one or more computer processors, a notification to a given user of the number of users in response to the given user triggering the geo fence, wherein the given user is predicted to respond to an offer included in the notification.

4. The computer-implemented method of claim 3, wherein the offer included in the notification relates to an availability of items relating to the weather-related event.

5. The computer-implemented method of claim 1, wherein the predicted effect the predicted meteorological event will have on the number users that trigger the geo-fence is determined by analyzing historical data from one or more previous meteorological events.

6. The computer-implemented method of claim 1, further comprising:
    upon receiving the indication of the predicted meteorological event, creating, by one or more computer processors, one or more additional geo-fences in a projected path of the predicted meteorological event;
    monitoring, by one or more computer processors, an actual path of the predicted meteorological event; and
    moving, by one or more computer processors, the one or more additional geo-fences to stay ahead of the predicted meteorological event.

7. The computer-implemented method of claim 1, further comprising:
    upon receiving an indication that the predicted meteorological event has passed, decreasing, by one or more processors, the size of the one or more additional geo-fences.

8. A computer program product for modifying an area covered by a geo-fence to increase a predicted number of users to receive notifications when triggering the geo-fence, the computer program product comprising:
    one or more computer readable storage media and program instructions stored on the one or more computer readable storage media, wherein the one or more computer readable storage media are not transitory signals per se, the program instructions comprising:
    program instructions to determine a target number of users to be reached for an area using a geo-fence;
    program instructions to receive an indication of a predicted meteorological event for the area covered by the geo-fence;

program instructions to generate a predicted number of users that will trigger the geo-fence based on:
a current size of the geo-fence, and
a predicted effect the predicted meteorological event will have on the number of users that trigger the geo-fence; and
program instructions to, responsive to the predicted number of users being below a threshold, increase the area covered by the geo-fence such that the predicted number of users at least meets the threshold.

9. The computer program product of claim 8, wherein the geo-fence is configured to increase the area covered by the geo-fence to at most a maximum area based on a maximum distance a given user is predicted to travel in a time period in which the geo-fence is active.

10. The computer program product of claim 8, further comprising:
program instructions to send a notification to a given user of the number of users in response to the given user triggering the geo fence, wherein the given user is predicted to respond to an offer included in the notification.

11. The computer program product of claim 10, wherein the offer included in the notification relates to an availability of items relating to the weather-related event.

12. The computer program product of claim 8, wherein the predicted effect the predicted meteorological event will have on the number users that trigger the geo-fence is determined by analyzing historical data from one or more previous meteorological events.

13. The computer program product of claim 8, further comprising:
program instructions to, upon receiving the indication of the predicted meteorological event, create one or more additional geo-fences in a projected path of the predicted meteorological event;
program instructions to monitor an actual path of the predicted meteorological event; and
program instructions to move the one or more additional geo-fences to stay ahead of the predicted meteorological event.

14. The computer program product of claim 8, further comprising:
program instructions to, upon receiving an indication that the predicted meteorological event has passed, decrease the size of the one or more additional geo-fences.

15. A computer system for modifying an area covered by a geofence to increase a predicted number of users to receive notifications when triggering the geo-fence, the computer system comprising:
one or more computer processors;
one or more computer readable storage media;
program instructions stored on the computer readable storage media for execution by at least one of the one or more processors, the program instructions comprising:
program instructions to determine a target number of users to be reached for an area using a geo-fence;
program instructions to receive an indication of a predicted meteorological event for the area covered by the geo-fence;
program instructions to generate a predicted number of users that will trigger the geo-fence based on:
a current size of the geo-fence, and
a predicted effect the predicted meteorological event will have on the number of users that trigger the geo-fence; and
program instructions to, responsive to the predicted number of users being below a threshold, increase the area covered by the geo-fence such that the predicted number of users at least meets the threshold.

16. The computer system of claim 15, wherein the geo-fence is configured to increase the area covered by the geo-fence to at most a maximum area based on a maximum distance a given user is predicted to travel in a time period in which the geo-fence is active.

17. The computer system of claim 15, further comprising:
program instructions to send a notification to a given user of the number of users in response to the given user triggering the geo fence, wherein the given user is predicted to respond to an offer included in the notification.

18. The computer system of claim 17, wherein the offer included in the notification relates to an availability of items relating to the weather-related event.

19. The computer system of claim 15, wherein the predicted effect the predicted meteorological event will have on the number users that trigger the geo-fence is determined by analyzing historical data from one or more previous meteorological events.

20. The computer system of claim 15, further comprising:
program instructions to, upon receiving the indication of the predicted meteorological event, create one or more additional geo-fences in a projected path of the predicted meteorological event;
program instructions to monitor an actual path of the predicted meteorological event; and
program instructions to move the one or more additional geo-fences to stay ahead of the predicted meteorological event.

\* \* \* \* \*